Sept. 13, 1932.  A. J. MUSSELMAN  1,877,360
PNEUMATIC WHEEL
Original Filed Oct. 4, 1929  3 Sheets-Sheet 1

Inventor
Alvin J Musselman.

By Bee & Bush
Attorneys

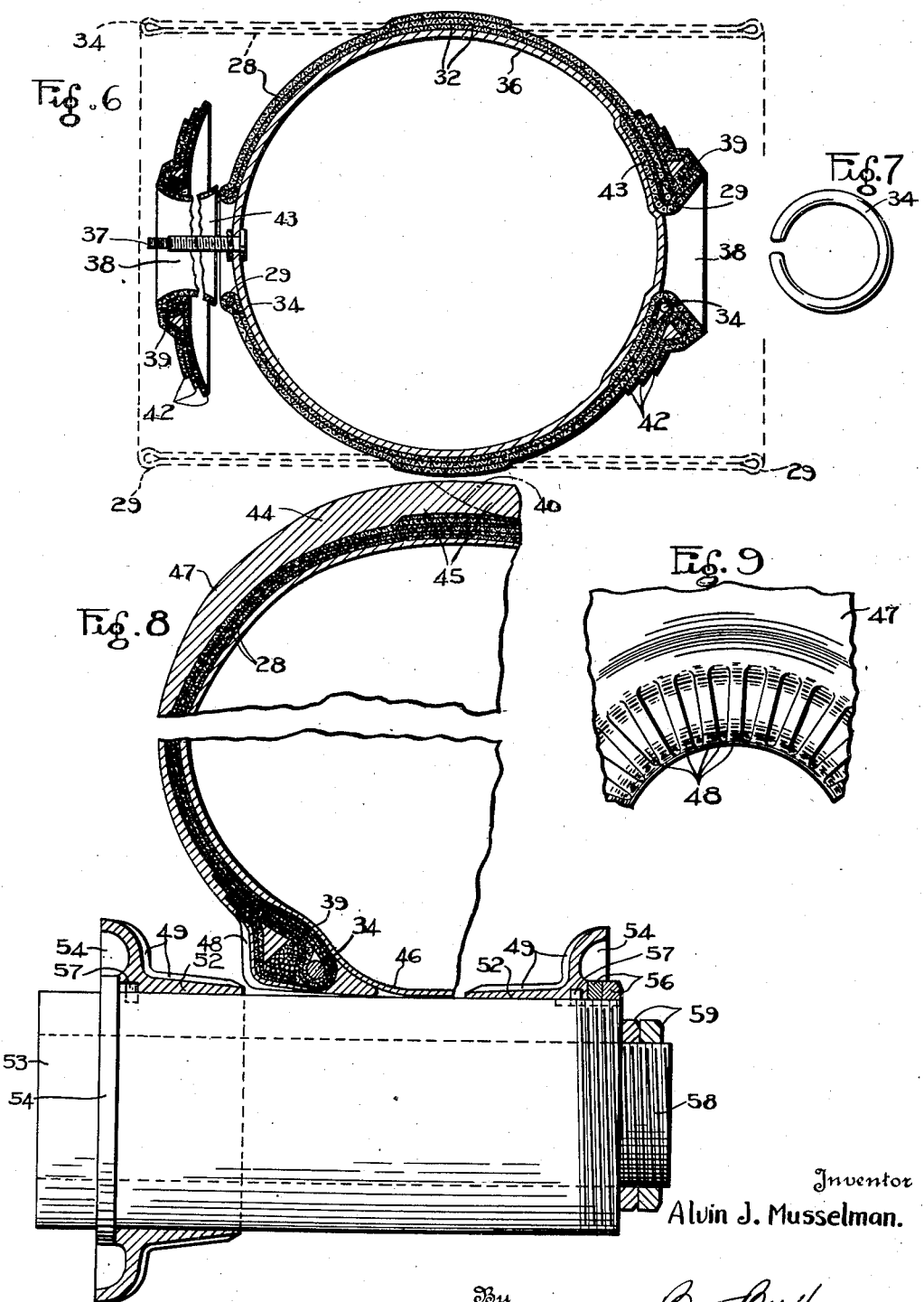

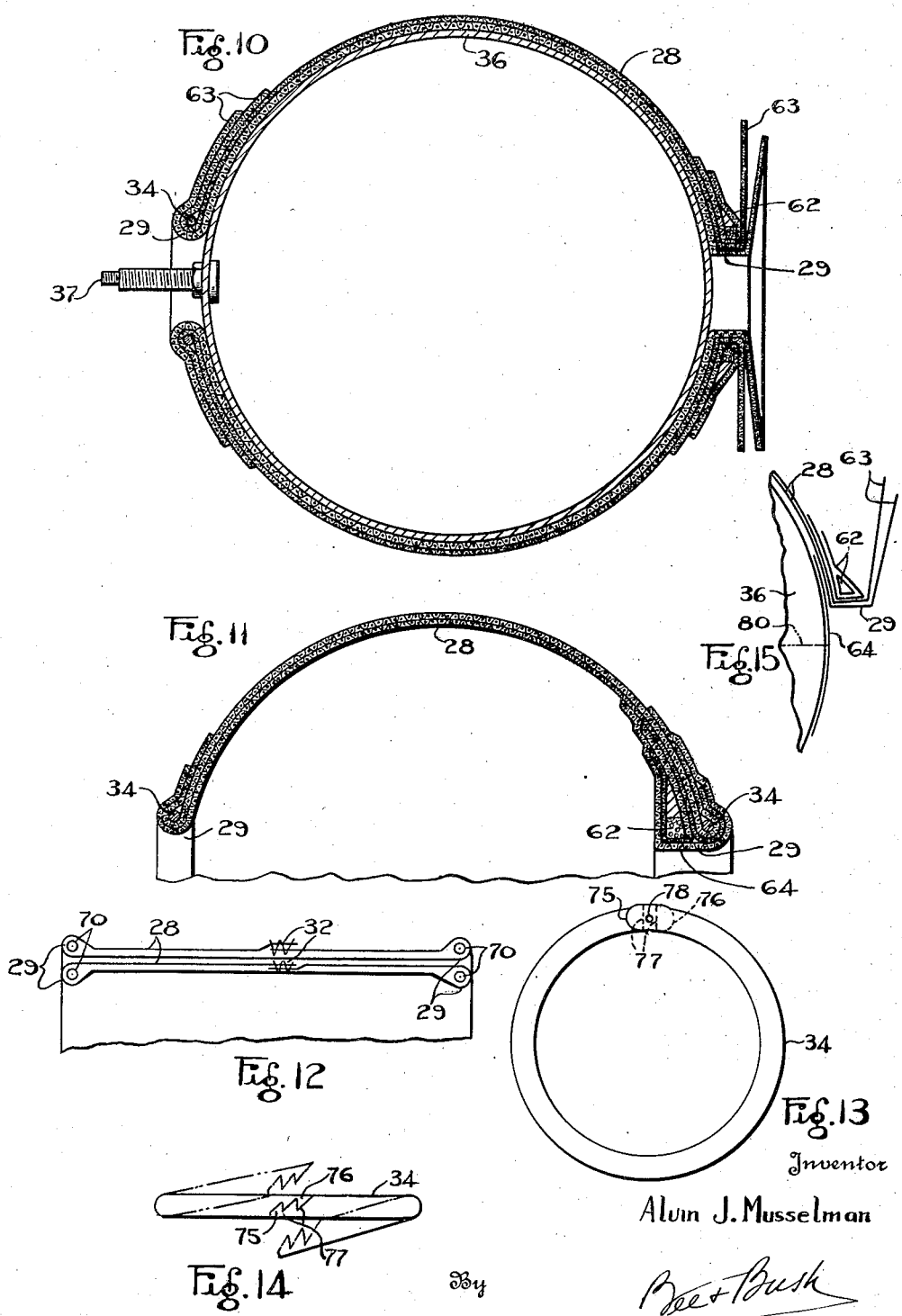

Patented Sept. 13, 1932

1,877,360

UNITED STATES PATENT OFFICE

ALVIN J. MUSSELMAN, OF CUYAHOGA FALLS, OHIO, ASSIGNOR TO THE GOODYEAR TIRE & RUBBER COMPANY, OF AKRON, OHIO, A CORPORATION OF OHIO

PNEUMATIC WHEEL

Original application filed October 4, 1929, Serial No. 397,392. Divided and this application filed February 10, 1931. Serial No. 514,746.

This invention relates to pneumatic balloon tires, and it has particular relation to the so-called flat-built type of tire, similar to that disclosed in either of my copending applications Serial Nos. 203,107 and 279,985, filed July 2, 1927 and May 23, 1928, respectively, which is adapted to serve as a substantially maximum portion of an entire assembly of a tire wheel. Also, the invention relates to methods of making tires of the type designated.

This application is a division of application Serial No. 397,392, filed October 4, 1929.

One object of the invention is to provide a tire wheel including a pneumatic tire having a much greater capacity for air under relatively low pressure, than ordinary balloon tires of equal maximum diameter.

Another object of the invention is to provide a tire wheel including a pneumatic tire which can be manufactured at materially less cost than previously known tires of equal maximum diameter.

Balloon tires of the type generally employed are built either by shaping strips of fabric about a toroidal core and stitching together the requisite number of elements of tire building material thereon, or by building a laminated cylindrical band which is subsequently shaped and vulcanized according to the final shape of the tire. In constructing the flat-built tires of the type previously known, the central portion of the cylindrical band was bulged radially outwardly while the edge or bead portions which were inextensible were moved axially toward each other.

The difference between the outer circumference and inner circumference of tires built according to either of these methods was considerably restricted because of the limited extent to which the flat-built tire could be radially bulged and the various limitations imposed upon the relation of the cross-sectional area of collapsible tire building cores to their other dimensions.

According to this invention, a tire can be built which has such a small inner circumference that spokes or disc wheels are not required, and the tire can be mounted directly upon a supporting hub barrel to form a tire wheel. On the other hand, the outer circumference of the tire can be as great or as small as that of any practical tire of other types. This kind of tire wheel is particularly adapted to be incorporated in the landing gear of aircraft, although it is applicable to various other types of vehicles.

For a better understanding of the invention, reference may now be had to the accompanying drawings, forming a part of the specification, of which;

Figure 6 is a cross-sectional view of a band shaped upon a spherical airbag;

Figure 7 is an elevational view of one form of bead ring for a tire;

Figure 8 is a fragmentary cross-sectional view, on a larger scale, of a tire and hub barrel upon which it is mounted;

Figure 9 is a fragmentary side-elevational view of a bead portion of the tire;

Figure 10 is a cross-sectional view of a tire illustrating the method of applying beads thereto;

Figure 11 is a fragmentary cross-sectional view illustrating another method of applying beads;

Figure 12 is a diagrammatical fragmentary cross-sectional view of a laminated band of rubberized fabric which has been prepared for shaping;

Figure 13 is an elevational view of a bead ring;

Figure 14 is a plan view with respect to Figure 13, of the bead ring; and

Figure 15 is a fragmentary diagrammatical view of a construction similar to that shown by Figures 10 and 11.

Figure 1:
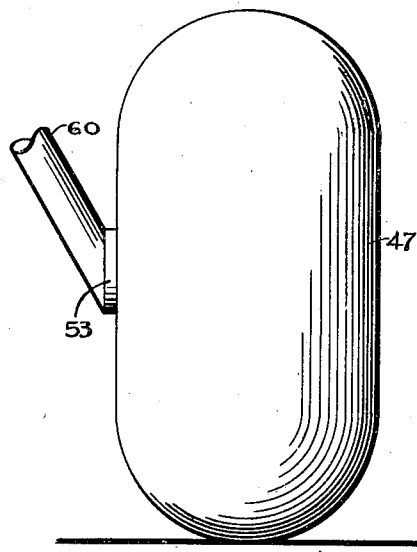
Figure 1 is a front elevational view of a tire wheel embodying the invention.
Figure 2:
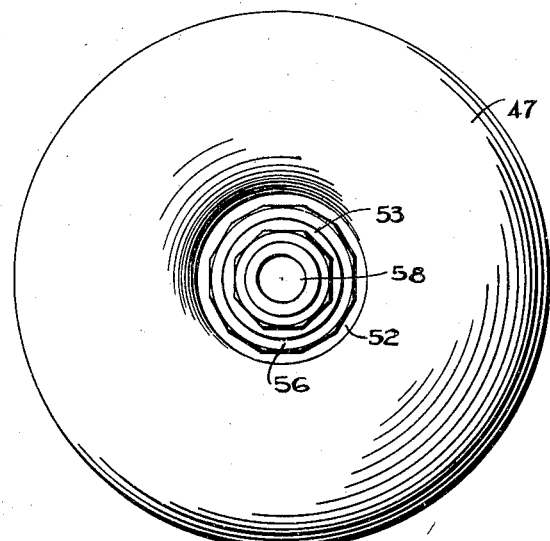
Figure 2 is a side elevational view of a tire wheel shown by Figure 1.
Figure 3:
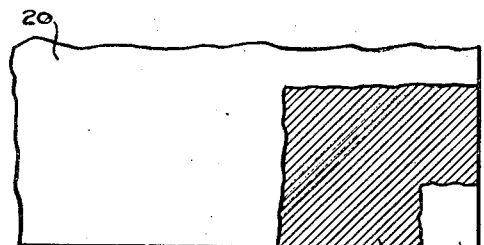
Figures 3 and 4 are fragmentary plan views of rubberized fabric material employed in constructing the tire carcass.
Figure 4:
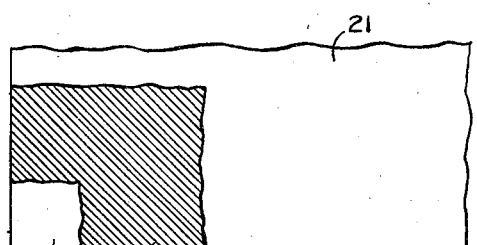

In the preferred form of the invention, strips of tire building material 20 and 21, composed of fabric 22 and 23 that is impregnated or coated with rubber layers 24 and 25, respectively, are disposed in one or more layers upon a collapsible cylindrical forming drum 27 to form a laminated cylindrical endless band 28. The diameter of the drum is approximately the same as that of the completed tire. Loops 29 are formed at the edge portions of the band by folding the original extremities thereof toward each other. The band is completed by securing the extremities in overlapping and interfitting relation, as indicated at 32, and by applying pressure thereto with a roller or other suitable tool. After the band 28 has been removed from the drum 27 it is slit at the looped portions thereof to form relatively small openings 33, through which bead elements in the form of gathering or shirring rings 34 are inserted into the loops. The looped edges are then gathered or shirred about the relatively small circumference of the rings 34, while the outer central circumference of the band remains substantially unchanged.

Either before or after the gathering rings 34 have been inserted into the loops, or after one of the rings has been so inserted, a substantially spherical airbag 36 having a valve stem 37 therein is inserted within the band 28. The airbag is inflated while both rings 34 of the band are disposed within the loops, and the valve stem projects through one of the rings. The airbag is inflated until its surface is very firm and shapes the band to the form shown by Figure 6. Then the inflating fluid is exhausted until the airbag is inflated at a relatively low pressure.

Bead rings 38 comprising a bead core 39 and anchoring strips 42 are applied upon each edge portion of the band adjacent the gathering rings 34. The outer strips 42 has a portion 43 which is secured to the inside of the band, as indicated at the right hand side of Figure 6. Since the airbag at this stage of the construction is inflated at a relatively low pressure, it can be bulged inwardly to facilitate application of the portion 43, as described.

A rubber tread 44 comprising annular discs 45 is applied to sides of the band in such manner that the discs overlap at their outer edges along a line 40 and extend along the side walls of the tire carcass to the bead portions 34 and 38. After vulcanization the discs 45 are of course integral instead of being divided along the line 40. Additional layers of rubber may be added to thicken the ground engaging portion of the tread. After the tread has been applied, the spherical airbag 36 is removed and an annular airbag is inserted therein which corresponds in shape and size to the inner tube 46, shown in Figure 8. In this form the whole assembly is placed into a mold for the purpose of vulcanization. After the airbag has been inflated, the assembly is vulcanized in a conventional manner to form a tire 47.

A plurality of radial recesses and ribs 48 are formed about the bead portions of the tire 47 and correspond to similar recesses and ribs 49 formed upon annular rings 52 that are secured upon a hub barrel 53. Substantially radial flanges 54 extend outwardly from the rings 52. These rings are maintained upon the hub barrel by means of an annular shoulder 54 and nuts 56, and dowel pins 57 prevent the rings from rotating upon the hub barrel. A suitable axle 58 rotatably supports a hub barrel 53 and is provided with nuts 59 to maintain the hub barrel in its proper operative position. The axle forms a part of an aircraft landing gear 60. When the tire is mounted upon the hub barrel, the recesses and ribs 48 and 49 interfit in such manner as to provide a firm connection between the tire beads and the hub.

In the form of the invention shown by Figure 10, the rings 34 are removed and inextensible beads 62 are inserted within the loops 29. In this construction the extremities 63 of the band do not overlap, and they can be disengaged and turned outwardly, as shown at the right hand side of Figure 10 to permit insertion of the beads 62. Then the extremities are pressed back to the position shown at the left hand side of Figure 10. The other tire building operations for completing the tire are the same as those described above.

Referring to Figure 11, the gathering ring 34 remains in the loops 29, while the inextensible bead rings 62 are applied to the inner portion of the band adjacent the rings 34. An anchoring strip 64 extending about the edge of the band upon both the inner and outer sides thereof maintains the beads in proper relation. After these operations, the tire is completed in the same manner as that described above.

As best shown by Figure 15 the anchoring strip 64 serves to prevent ply tension from being disturbed and is applied circumferentially about the airbag 36. In this construction, the strip 64 is composed of rubberized fabric having adhesive surfaces which adhere to the airbag on the one side and to the bands 28 on the other or outer side. Thus when the extremities 63 are disengaged to permit withdrawal of the temporary bead 34 and the insertion of the permanent endless bead ring 62, the portions of the plies 28 adjacent the loops 29 are held firmly against the airbag by the band 64. If desirable, the band 64 may then be removed or it may be slit circumferentially along a line 80 and the edges adjacent the slit stitched to the contiguous portions of the bead loops 29 to become a permanent portion of the tire.

Figure 5:
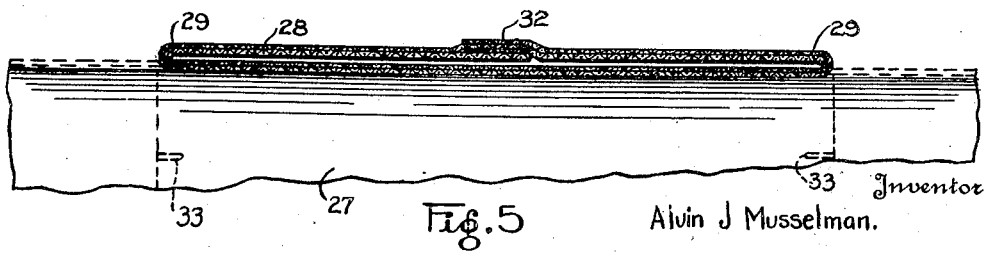
Figure 5 is a fragmentary cross-sectional view of a cylindrical mandrel upon which a fabric band is formed according to the invention.

According to Figures 5 and 12, a plurality of bands 28 can be constructed separately in the manner described above with reference to Figure 5, and subsequently arranged in telescoping relation, as shown by Figure 12. Also, one of the bands can be shaped and subsequently a second band inserted therein, which is then inflated by employing the airbag 36 or the like. The looped edge portions 29 are shirred or gathered about the rings 34 or drawn by means of flexible tensile members 70 in shirred relation about the central support or hub barrel. Thus the tire is composed of as many plies as necessary for any strength or size of tire wheel, and a plurality of tensile gathering members 34 or 70 are employed in addition to the beads 38 or 62. On the other hand, if desirable, the telescoping double band construction can be employed in tire wheels similar to those disclosed in the copending applications mentioned above. By experiment it has been found that more than one gathering ring at each side of the tire adapt themselves in perfectly fitting relation in a tire wheel assembly after separate bands 28 have been formed and subsequently telescoped in the manner described.

As best shown by Figures 13 and 14, the ring 34 is provided with overlapping ends 75 and 76 having interfitting teeth 77 which are interlocked when the ring is in its normal position. Preferably the ring is composed of resilient metal and the ends 75 and 77 are sprung apart, as shown by the broken lines of Figure 14, in order to receive the loops 29 which are gathered thereon. If desirable a suitable pin 78 can be inserted through the ends 75 and 76 to insure proper connection of the latter in addition to the interlocking teeth 77.

From the foregoing description, it will be apparent that the pneumatic tire 47 and the hub barrel constitute a tire wheel without a wheel disc or spokes, and in which the rubberized fabric is greatly condensed about the bead portions adjacent the side walls of the tire; that is, the cords are compressed very closely together to form substantially uniformly curved surface configuration. Accordingly, the tire is able to withstand relatively great loads, although the side walls are relatively thin, and the transverse cross-sectional diameter of the tire is relatively great. Thus, a tire of this character, which is relatively inexpensive and has a maximum air capacity also has a wide ground engaging tread that facilitates the supporting of heavy loads under relatively low pressure.

Although only the preferred forms of the invention have been illustrated and described in detail, it will be apparent to those skilled in the art that the invention is not so limited, but that various modifications may be made therein without departing from the spirit of the invention or from the scope of the appended claims.

What I claim is:

1. A pneumatic balloon tire wheel comprising an axle, a hub-barrel journaled thereon and equipped with retaining flanges, and a balloon tire mounted directly on said hub-barrel and secured to said retaining flanges, said tire including an endless fabric band having looped edges shirred to form small annuli, gathering rings in said loops, inextensible beads secured to said structure at said annuli, and a rubber compound incorporated with the fabric, the balloon tire being vulcanized as a whole.

2. A balloon tire structure comprising an endless band of tire building material having loops at the edge portions thereof, gathering rings engaging said loops, the edge portions of the band being shirred upon the rings, beads comprising inextensible rings applied to said band adjacent said gathering rings, and a rubber compound incorporated with the band, the whole structure being vulcanized together.

3. A balloon tire structure comprising a fabric band having its edge portions gathered into small annuli, the fabric surrounding the annuli being condensed and lying substantially in curved planes, normally inextensible bead rings applied to said structure at said annuli, and annular rubber discs applied to the sides of the band, the inner and outer edge portions of the discs engaging the bead portions and central tread portion respectively of the tire, the whole structure being vulcanized together and the portions of the structure comprising beads and annuli being shaped to afford a tire base adapted to engage exterior retaining rings.

In witness whereof, I have hereunto signed my name.

Signed at Akron, in the county of Summit and State of Ohio, U. S. A., this 7th day of February, 1931.

ALVIN J. MUSSELMAN.